(12) United States Patent
Anhut et al.

(10) Patent No.: US 10,156,710 B2
(45) Date of Patent: Dec. 18, 2018

(54) MICROSCOPE AND MICROSCOPY TECHNIQUES

(75) Inventors: Tiemo Anhut, Jena (DE); Thomas Kalkbrenner, Jena (DE); Daniel Schwedt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 13/251,452

(22) Filed: Oct. 3, 2011

(65) Prior Publication Data

US 2012/0268812 A1    Oct. 25, 2012

Related U.S. Application Data

(60) Provisional application No. 61/480,707, filed on Apr. 29, 2011.

(30) Foreign Application Priority Data

Oct. 1, 2010    (DE) .................. 10 2010 047 352
Mar. 8, 2011    (DE) .................. 10 2011 013 613

(51) Int. Cl.
   *G02F 1/01*    (2006.01)
   *G02F 1/11*    (2006.01)
   (Continued)

(52) U.S. Cl.
   CPC ..... *G02B 21/0068* (2013.01); *G02B 21/0092* (2013.01); *G02B 21/241* (2013.01);
   (Continued)

(58) Field of Classification Search
   CPC . G02B 21/0068; G02B 21/0092; G02B 26/06
   (Continued)

(56) References Cited

U.S. PATENT DOCUMENTS 3,628,848 A  * 12/1971  Nomarski ............... 359/371
6,134,010 A  * 10/2000  Zavislan ................ 356/364
(Continued)

FOREIGN PATENT DOCUMENTS

DE    199 04 592        9/2000
EP    0 500 717 B2     11/2003
(Continued)

OTHER PUBLICATIONS

Iketaki, Y. et al. Demonstration of Super-Resolution Microscopy Using a High Numerical-Aperture Oil-Immersion Objective Lens, e-Journal of Surface Science and Nanotechnology, vol. 6 (Jul. 24, 2008), pp. 0-4.*

(Continued)

*Primary Examiner* — Cara E Rakowski
(74) *Attorney, Agent, or Firm* — Duane Morris LLP

(57) ABSTRACT

A microscope with at least one illumination beam that is phase modulated in a section along its cross-section with a modulation frequency and a microscope lens for focusing the illumination beam into a test as well as a detection beam path and at least one means of demodulation, wherein at least one polarization altering item is scheduled in the illuminating beam path, for which a phase plate is subordinated that exhibits at least two areas with different phase influence.

33 Claims, 14 Drawing Sheets

(51) Int. Cl.
*G02B 21/00* (2006.01)
*G02B 21/24* (2006.01)
*G02B 26/06* (2006.01)

(52) U.S. Cl.
CPC .......... *G02B 26/06* (2013.01); *G02F 1/0136* (2013.01); *G02F 1/11* (2013.01); *G02F 1/116* (2013.01)

(58) Field of Classification Search
USPC ................................................ 359/370–371
See application file for complete search history.

(56) References Cited

U.S. PATENT DOCUMENTS

| | | | |
|---|---|---|---|
| 6,144,489 A * | 11/2000 | Wilson et al. | 359/385 |
| 6,753,968 B2 * | 6/2004 | Hill | 356/491 |
| 7,820,958 B2 | 10/2010 | Ishihara et al. | |
| 2002/0154317 A1 | 10/2002 | Kempe | |
| 2006/0158721 A1 * | 7/2006 | Nakata et al. | 359/386 |
| 2011/0140000 A1 * | 6/2011 | Iketaki | G02B 21/0068 250/458.1 |

FOREIGN PATENT DOCUMENTS

| | | |
|---|---|---|
| JP | H07 167 933 A | 7/1995 |
| JP | 2005 345 561 A | 12/2005 |
| JP | 2006 058 477 A | 3/2006 |
| JP | 2008 225 013 A | 9/2008 |
| WO | WO 2009/008838 A1 | 1/2009 |
| WO | WO 2009008838 A1 * | 1/2009 |

OTHER PUBLICATIONS

Iketaki, Y. et al. Investigation of the center intensity of first- and second-order Laguerre-Gaussian beams with linear and circular polarization, Optics Letters, vol. 32, No. 16 (Aug. 15, 2007) pp. 2356-2359.*
Machine translation of JP200658477, retrieved electronically from Espacenet, Nov. 8, 2016.*
Machine translation of JP2005345561, retrieved electronically from Espacenet, Nov. 10, 2016.*
Machine translation of JPH07167933, retrieved electronically from Espacenet, Nov. 10, 2016.*
Wong, Chee Howe, et al., "Simple spatial phase modulator for focal modulation microscopy", Applied Optics 2009, 48(17):3237-3242.
TOF camera with lock-in pixels: http://www.mesa-imaging.ch/.
Gated-Intensifier Camera: e.g. Tautec Pico Star: http://www.tautec.com/4709/4736.html.
Sueda, K., "Laguerre-Gaussian beam generated with a multilevel spiral phase plate for high intensity laser pulses", Optics Express 2004, 12(15):3548-3553.
Leray, Aymeric, et al., "Rejection of two-photon fluorescence background in thick tissue by differential aberration imaging", Optics Express 2006, 14(22):10565-10573.
Leach, Jonathan, et al. , "Observation of the vortex structure of a non-integer vortex beam", New Journal of Physics (2004) 6(71), PII: S1367-2630(04)80050-8.
Chen, N.G., et al., "Real time focal modulation microscopy", Proceedings of SPIE 2010, 7570:75700Q1-75700Q6.
Chen, Nanguang, et al., "Focal modulation microscopy", Optics Express 2008, 16(23):18764-18769.
English translation of the Notification of Reasons for Rejection in Japanese Office Action.

* cited by examiner

PRIOR ART

PRIOR ART

To scanner

MICROSCOPE AND MICROSCOPY TECHNIQUES

This application claims the benefit of U.S. provisional patent application 61/480,707 filed Apr. 29, 2011 which claims priority to German patent application no. DE 10 2011 013 613.4 filed Mar. 8, 2011 which claims priority to German patent application no. DE 10 2010 047 352.9, filed Oct. 1, 2010, the contents of which are hereby incorporated by reference herein.

STATE OF THE ART

The following describe the state of the art:
1. Chen et al., Opt. Express 16, 18764, 2008
2. Wong, et al., Appl. Opt. 48, 3237, 2009
3. TOF camera with lock-in pixels; made by Mesa Imaging AG of Switzerland
4. Gated-Intensifier Camera: e.g. tautec pico star; made by Tau Tec LLC, Columbia, Md.
5. Sueda, et al., Opt. Express 12, 3548, 2004
6. WO 2009/008838
7. EP 500717 B2 two-photon-microscopy
8. A Leray and J. Mertz, Opt. Express 14, 10565 (2006).

A rapid switch between different spatial light distributions is required in various areas of optics. For example, one can use such a possibility in laser screen microscopy in order to be able to switch very rapidly between different focal fields. This is especially important when one would like to influence only the light in the focus of one lens. Here, a method in which a three-dimensional illustration of optically thick tests is achievable was recently demonstrated whereby the background light is discriminated (See references 1, 2 and 6.).

In this case, the basic feature is that a property only influences the fluorescence that is generated in the focus temporarily, whereby the beam should not be modulated outside the focus. Until now, this method has been based on rapid switches of the optical phase in the pupil of a lens. Until now it has been demonstrated that the phase is switched in two half pupils.

SOLUTION

Similar to the half pupil switching described above, switching between the optical phases of other split beams can also be used expediently. Moreover, it is possible to use not only the phases but generally field mode switching in order to generate a temporary modulation of the beam from the focal volume, whereby the beam is not modulated outside the focal volume over time. Moreover, rapid mode switches for this purpose should be discussed here.

Besides phase switching, switching polarization is also proposed as a further possibility in order to shift rapidly between two different field modes of the excitation spot whereby the beam coming from the focal volume is modulated. It has been recognized that a similar effect can be achieved in this case as with switching the phase. The effects of the switching particularly influence the stimulation of fluorescence in the focus.

Qualifiable solutions should lead to a modulation in the area of several MHz. With that said, they are basically suitable for use in laser scanning microscopes (LSM) to increase the depth of penetration without losses of scanning speed. Another increase of the speed ensues by parallelization using multi-spot microscopy. However, a slower modulation is also always possible and can be analogously discontinued.

Because of their advantageously high modulation frequencies, essentially only rapid switching opto-electronic elements such as, for example, AOMs and EOMs, qualify. With these solutions, a property should be switched that essentially ultimately has an effect on the field in focus and results in modulating the focus field, while the essential items that are out of focus are not significantly modulated.

The invention is characterized by the features of the independent patent claims annexed hereto.

Additional features are set forth in the annexed dependent claims.

A schematic description of various embodiments of the invention follows below.

BRIEF DESCRIPTION OF THE DRAWINGS

The present inventions will be described in greater detail, using examples with reference to the annexed drawings, in which.

EMBODIMENT 1

In an initial embodiment, it is assumed that the phases are generated on a passive element which introduces a polarization-dependent phase deviation in different spatial areas, preferably in a lens pupil. In order to generate a rapid temporary modulation, the polarization is manipulated over time using, for example, an EOM, or constructions that generate a different polarization using a path segmentation and rapidly shifts this path using an AOM/AOTF.

By switching as well as rotating the polarization in FIG. 1, a portion of the beam pushing through the phase plates is influenced in each case in its optical phase, while the parts of the beam that go through the polarization-independent part of the plate do not experience any phase deviation. Hence, by switching the polarization condition it is possible to achieve a switchover of the phases. The phase plates shown in FIG. 1 are only exemplary. In principle, different geometries are possible here. By, for example, modulating an EOM, the polarization condition can be varied either sinusoidally, for example, or with a rectangular profile or some other advantageous wave shape. In so doing, the transition in focus in the microscope is influenced differently over time.

Figure 1A:
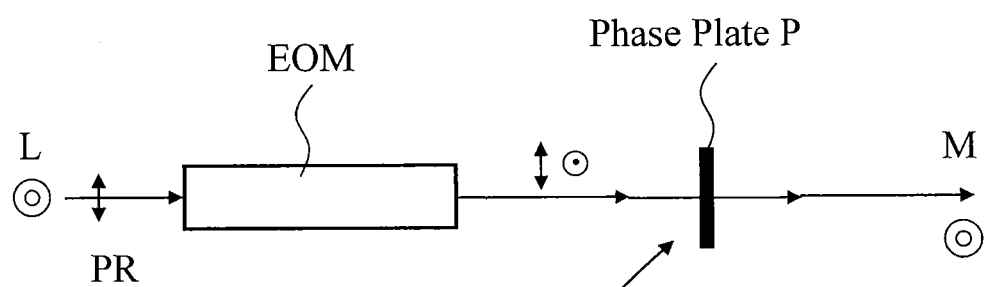
FIG. 1A is a diagram schematically illustrating a rapid optical mode switcher based on an electro-optic modulator ("EOM") and passive phase elements arranged in the illuminating beam path.

FIG. 1A shows one such rapid optical mode switcher based on an electro-optic modulator (EOM) and passive phase elements (P) arranged in the illuminating beam path.

The passive phase elements displayed by way of example here consist, in each case, of a combination of a double refractive crystal, a phase plate P is represented in the form of a shared λ/2 plate and, with respect to the phase, a component that is independent of the direction of polarization that is, by way of example, made of glass. In the process, the phase plate is aligned in such a way that the rapid direction of the crystal is advantageously aligned in parallel and/or vertically or in some other optimized angle to the irradiated laser polarization.

Figure 1B:
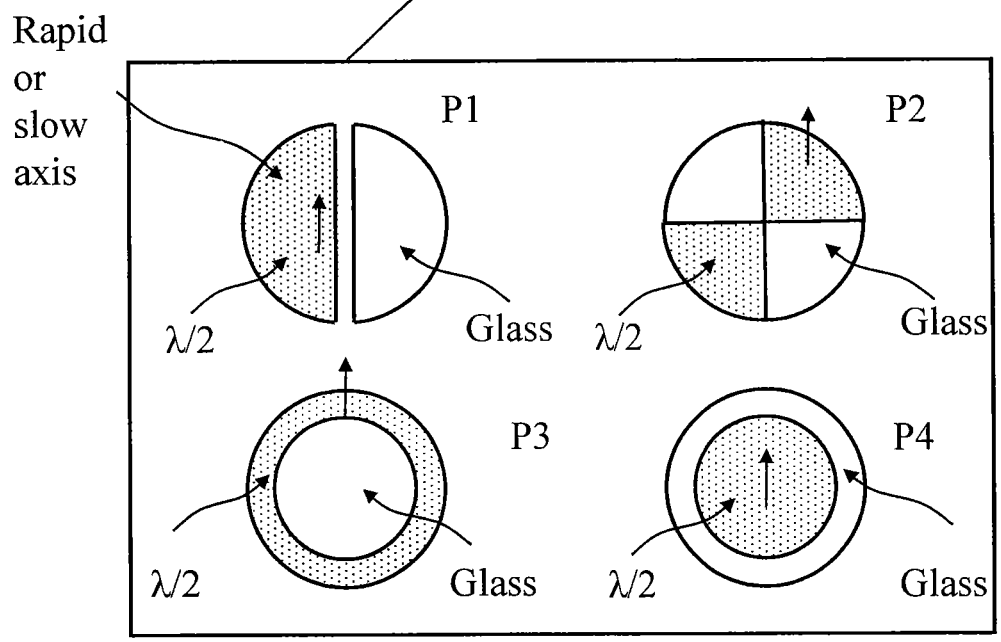
FIG. 1B is a diagram illustrating various modifications of phase plate P.

Various modifications of the phase plate P are represented in FIG. 1B; a half-page division into a λ/2 half and a glass half in P1, a quarter division in the opposite λ/2 quarter and glass quarter in P2, an out-lying λ/2 ring and an inner glass core in P3 and vice-versa an outlying glass ring and an inner-lying λ/2 core in P4.

Glass is used here only by way of example. Amorphous quartz [Suprasil] or other non-double refractive materials can also be used.

In each case, as shown by an arrow, the orientation of the extraordinary axis of the respective λ/2 part is represented. If a polarized beam of light enters parallel to the direction of the arrow of this element, then a phase retardation of about half a wave length relative to the glass part will be generated in the λ/2 part. If, however, its polarization is vertically oriented to the direction of the arrow, then no phase retardation will be generated.

The element P is in connectivity with the EOM that causes a rapid rotation of the polarization direction PR of the incidental beam of light L, usually a linearly polarized laser beam, by corresponding excitation.

After passing through P, the beam of light proceeds further, as described below, in the direction of the microscope M, via a scanning unit, not shown, for testing, as is known.

By virtue of the half-page alteration of the plate P, the beam of light undergoes the field modulation typical for Focal Modulation Microscopy ("FMM").

A standard technique is also part of the invention, whereby the formation of the phase element, such as by exchange or excitation of an SLM, is altered and by measuring the modulation contrast, e.g., by measurements with a switched on plate P and an outwardly tilted plate P (without FMM), whereby an optimization of the FMM signal can take place.

Within the context of the invention, even a rotation of the plate P can take place in a fixed beam of light L instead of rotating the polarization by the EOM.

Figure 1C:
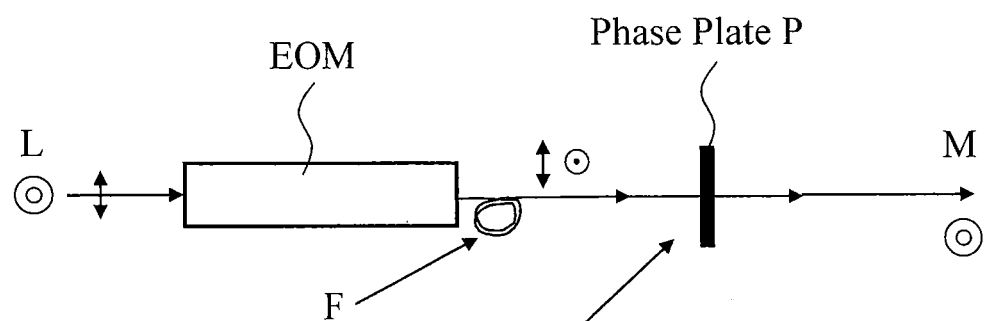
FIG. 1C is a diagram schematically illustrating a rapid optical mode switcher as in FIG. 1A, wherein modulation of the polarizing direction of the laser can be effected before coupling into a fiber ("F").
Figure 1D:
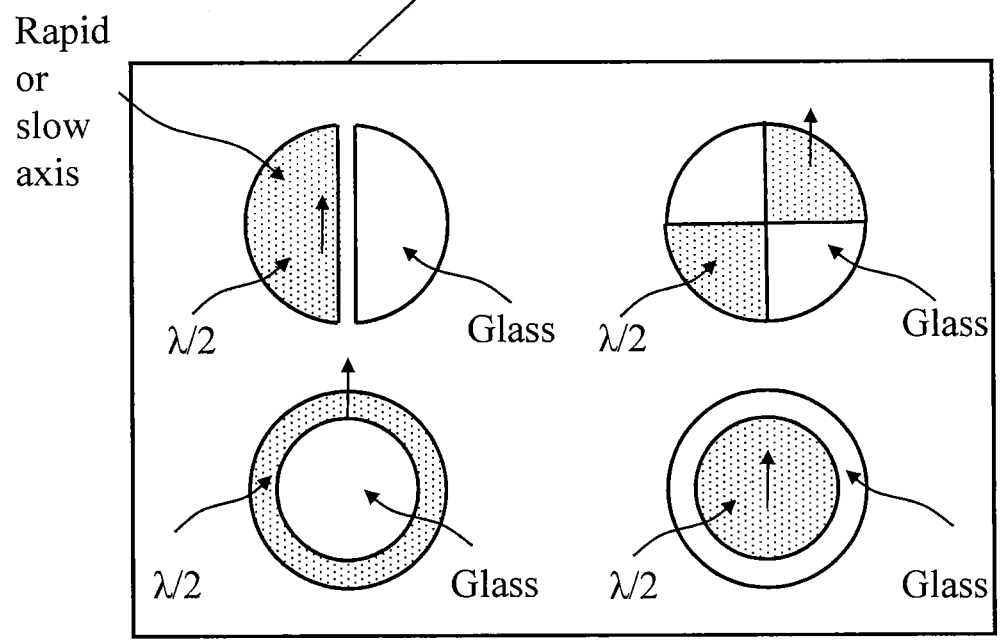
FIG. 1D is a diagram illustrating modifications of phase plate P.

FIG. 1C shows, as in FIG. 1A, the rapid optical mode switcher, based on an EOM and passive phase elements.

In FIG. 1C, the inventive approach is still further expanded by virtue of the fact that modulation of the polarization direction of the laser can now take place before being coupled into a fiber F, if this fiber, as is typical for polarization retentive fibers, receives the polarization condition of the light. The phase element is then again in a pupil of the optical system by virtue of the fiber.

This embodiment is especially advantageous if, in the actual optical system/appliance/microscope/scanning head, there is little room for construction.

By contrast to the prior art, here an electro-magnetic insulation of the EOM can take place by applying the passive phase elements in connectivity with the fiber that is used which avoids influence from the measuring arrangement through the high frequency of electric fields emitted from the EOM. The EOM can also be conveniently accommodated separately in a laser module.

In 1D, 4 four possible phase plates, P1-P4, are again shown by way of example.

EMBODIMENT 2A

In another advantageous embodiment, a solution is realized according to the invention in which the two modes are already available and are switched by means of an EOM, AOM or AOTF between these modes. This principle still differs widely from the state of technology documented up to this point, since now switching in the focus does not place by switching the optic phases but between two optic field modes. In doing so, an equivalent beginning and end state is produced, whereby, however, the transition from one configuration into the other configuration, distinguished by the respective focus field structure, takes place incoherently.

Illustration 2A shows a rapid optical mode switch based on an EOM to which a polarizing beam splitter PBS is subordinated in the light path.

For redirecting light, M1-M4 are scheduled after the PBS mirror.

A polarization direction Pol1 generated (reflected) by PBS is diverted via M1-M4.

There is a phase element between M2 and M3 that generates a donut mode DM of the beam distribution for a specific polarization direction (SPP spiral phase plate, [5]) that is unified again at PBS with the part going through PBS after M4.

Illustration 5B shows an example of a spiral phase plate from:
New J. Phys. 6 (2004) 71; doi:10.1088/1367-2630/6/1/071; PII: S1367-2630(04)80050-8; "Observation of the vortex structure of a non-integer vortex beam"; Jonathan Leach, Eric Yao and Miles J Padgett This linearly polarized laser beam L is propagated by the wave-retarding EOM, which acts like a rapidly switchable polarization rotator. In this way, the light is transmitted on its further path by the following polarizing beam splitter (PBS) (e.g., the polarized light that is parallel to the level of the plate). For the other polarization direction, the light is directed upward in the drawing and encounters an element like a spiral phase plate SPP that generates a donut mode from the Gauss mode (e.g., [5]).

Alternatively, here too other mode switching elements such as sub-wavelength structures or DOE's (Diffractive Optical Elements) can be introduced to this beam. Accordingly, the light is again reflected to the PBS and is alternatively overlaid in a timely fashion with the beam of the second polarization. A modulation of the EOM consequently causes a modulation of the different field modes (pol1 2 as well as GM) and thereby modulation of the light in the focus of the microscope lens.

For the time-dependent intensity of the light, which is emitted from the focal volume:

$$I(t)=\int C(r)I_p(r,t)dr$$

applies.

Here, C(r) denotes the spatially varying concentration of excitable molecules. The integral stretches over an area that contains the focal volume. $I_p(r,t)$ denotes the varying stimulation intensity over time, which in the case of a change-over between two modes is accounted for by:

$$I_p(r)=\int G(r)(1+\cos(\omega t))_+ LG(r)(1+\sin(\omega t))$$

In this case, it is important that essentially only the light in the focus undergoes this temporal modulation, but all the light outside the focus is essentially not, or, alternatively, fundamentally more weakly modulated.

By means of a lock-in-detection the temporally varying portion then lets itself be separated from the temporally constant portion. This temporally varying portion corresponds to the difference between the two different focal fields whereby the unmodulated out of focus portion is temporally constant and cancelled by the in-phase detection using, for example, a lock-in-detection.

Illustration 2B shows the intensity distribution of a Gauss mode and a donut mode (Laguerre-Gauss-Mode). The axes mark a scaled lateral spatial expansion in the focal level.

The proposed solution especially differs from the state of the technology in that here the light field is not dismantled in the pupil into its individual parts and influenced using a phase modulator in different spatial parts but that a temporally varying switch takes place between two different focal fields. In doing so, a series of advantages for its practical realization emerge. First of all, the most significant advantage consists in the attainable modulation speed.

Figure 5A:
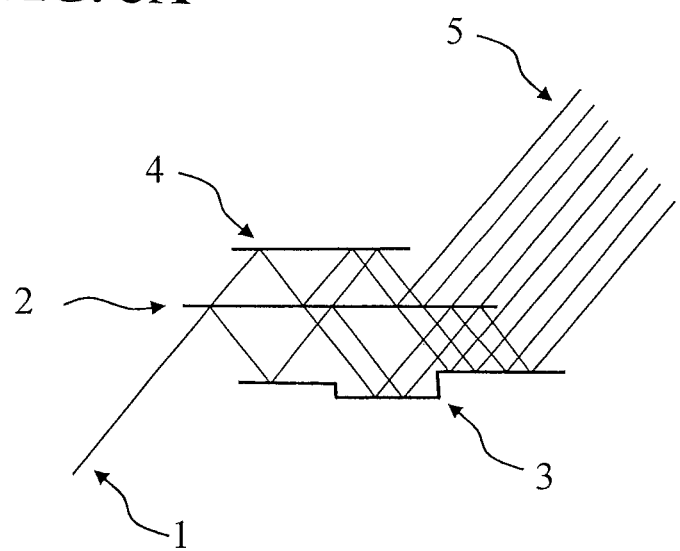
FIGS. 5A and 5B are diagrams illustrating expandability by several focal volumes.
Figure 5B:
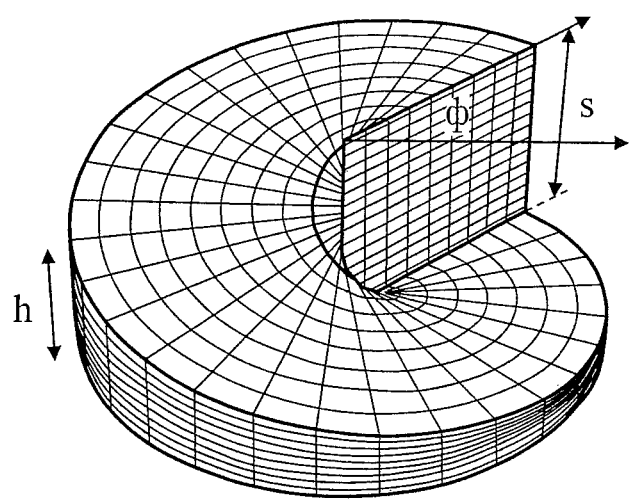

Another advantage of the solution is its simple expandability by several focal volumes. In doing so, one would, for example, shine several Gaussian beams into the arrangement and reshape these in the corresponding optical way by means of an array transformer (e.g., a spiral phase mask array). The production of several focal volumes by itself is, for example, described in DE19904592 (see also FIG. 5A).

Figure 2A:
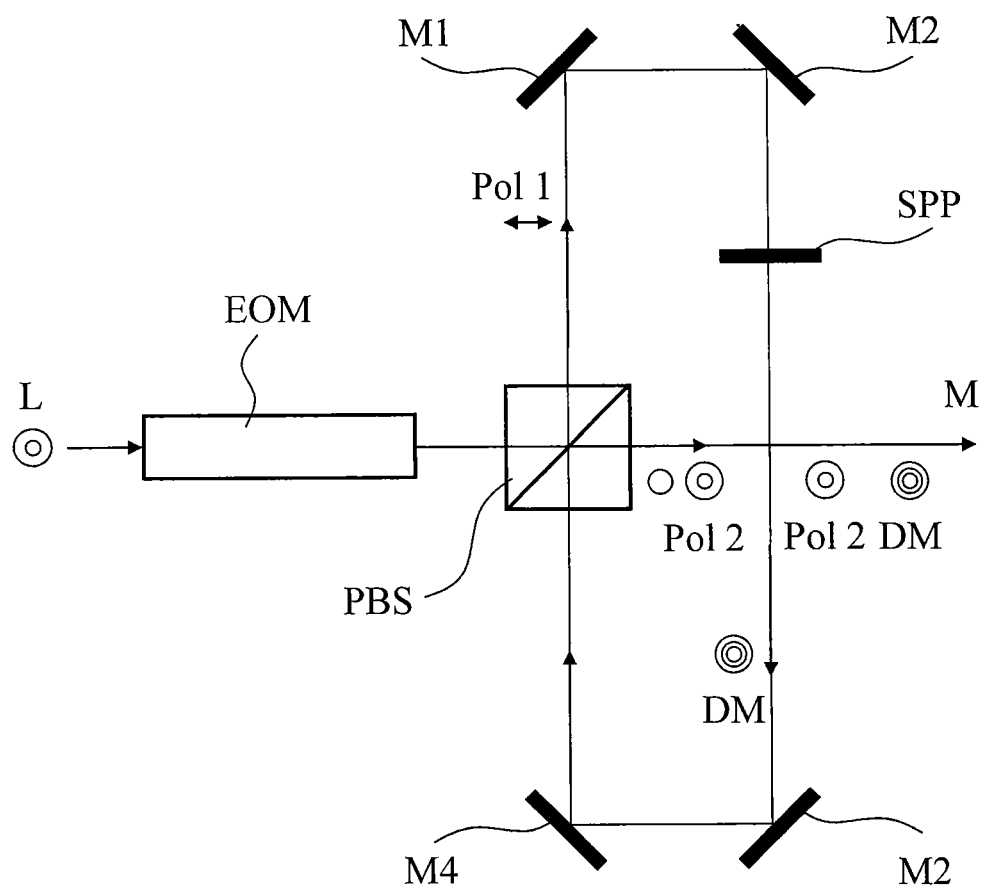
FIG. 2A is a diagram schematically illustrating a rapid optical mode switch based on an EOM to which a polarizing beam splitter ("PBS") is subordinated.
Figure 2B:
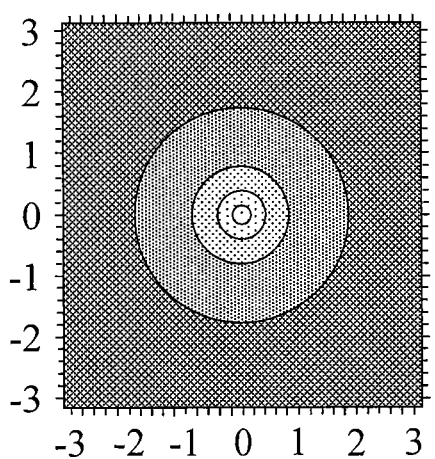
FIG. 2B shows intensity distributions of a Gauss mode and a donut mode.
Figure 2B:
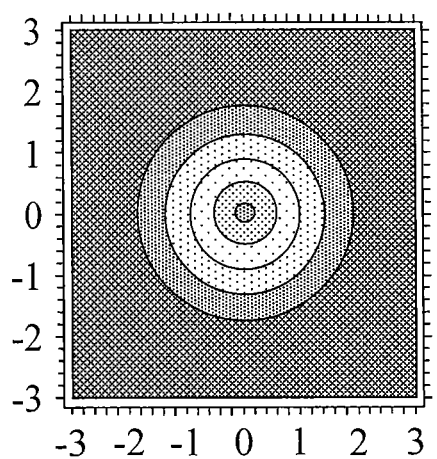
Figure 2C:
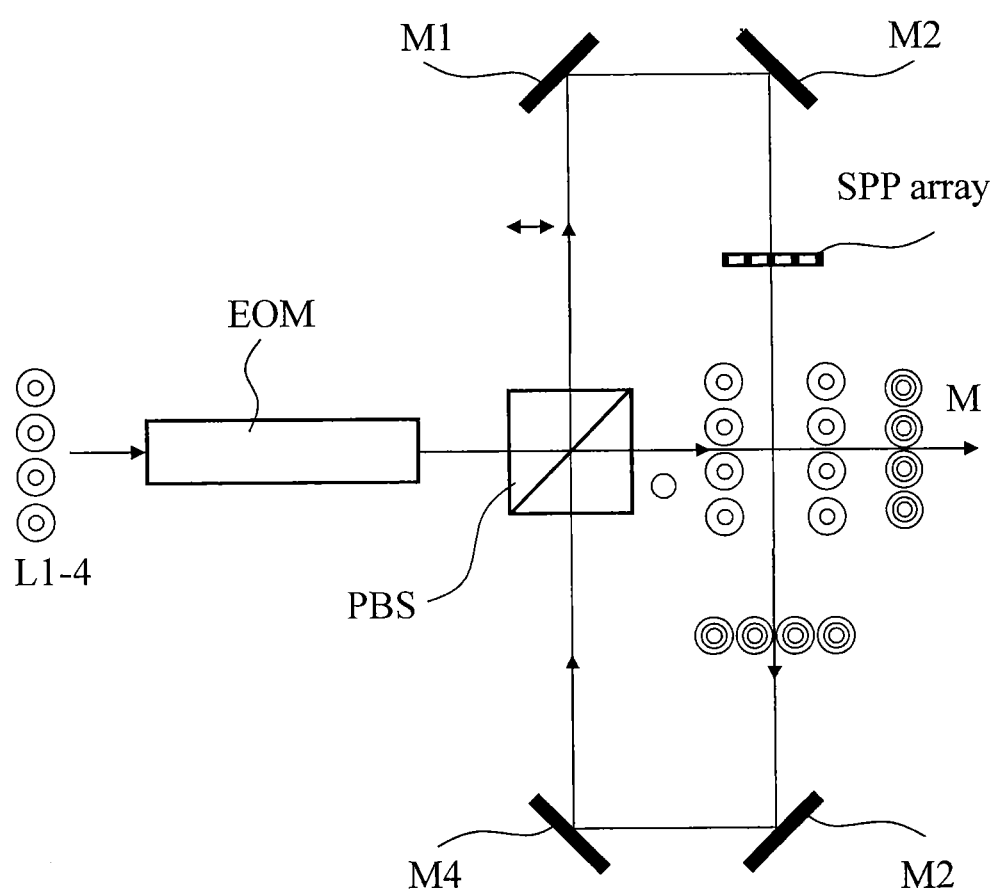
FIG. 2C is a diagram schematically illustrating a rapid optical mode switcher.

A schematic embodiment is shown in FIG. 2C:

Here, a multi-spot-variation for mode modulation is represented by the example of 4 specifically collimated beams L1-4 that are finally focused in the microscope M in the direction of the focus level.

The flow path of L1-4 takes place analogously to that in FIG. 2A via the arrangement presented there, whereby, instead of a single spiral phase mask, here an SPP array, schematically represented by four SPP's, is envisaged.

For the passageway of the beams L1-4 from the EOM, this can feature an appropriately large cross-section and/or also be pre-arranged in the direction of the light of the multi-spot-production or several EOM's for L1-4 can be provided, even with different modulation frequencies or a segmented EOM with differently actuated cross-section areas.

In FIG. 2C, only four beams are represented, whereby the invention can ultimately also advantageously be expanded for this to modulate an essentially larger number of beams and, consequently, make a quasi-confocal multi-focus microscopy possible. While individual detectors/lock-in-modules can still be used for 4 foci in the descanned mode, for detection in the latter case a detector beam is preferably suitable in the descanned case or a camera with a modulatable intensifier (multi-channel plate) [4] or also smart-pixel CMOS cameras [3], which allow a pixel-wise demodulation in the camera, in the unscanned or direct detection mode.

EMBODIMENT 2B

Switching between two modes can also take place very rapidly by means of, for example, an acousto-optic modulator (AOM).

Figure 3:
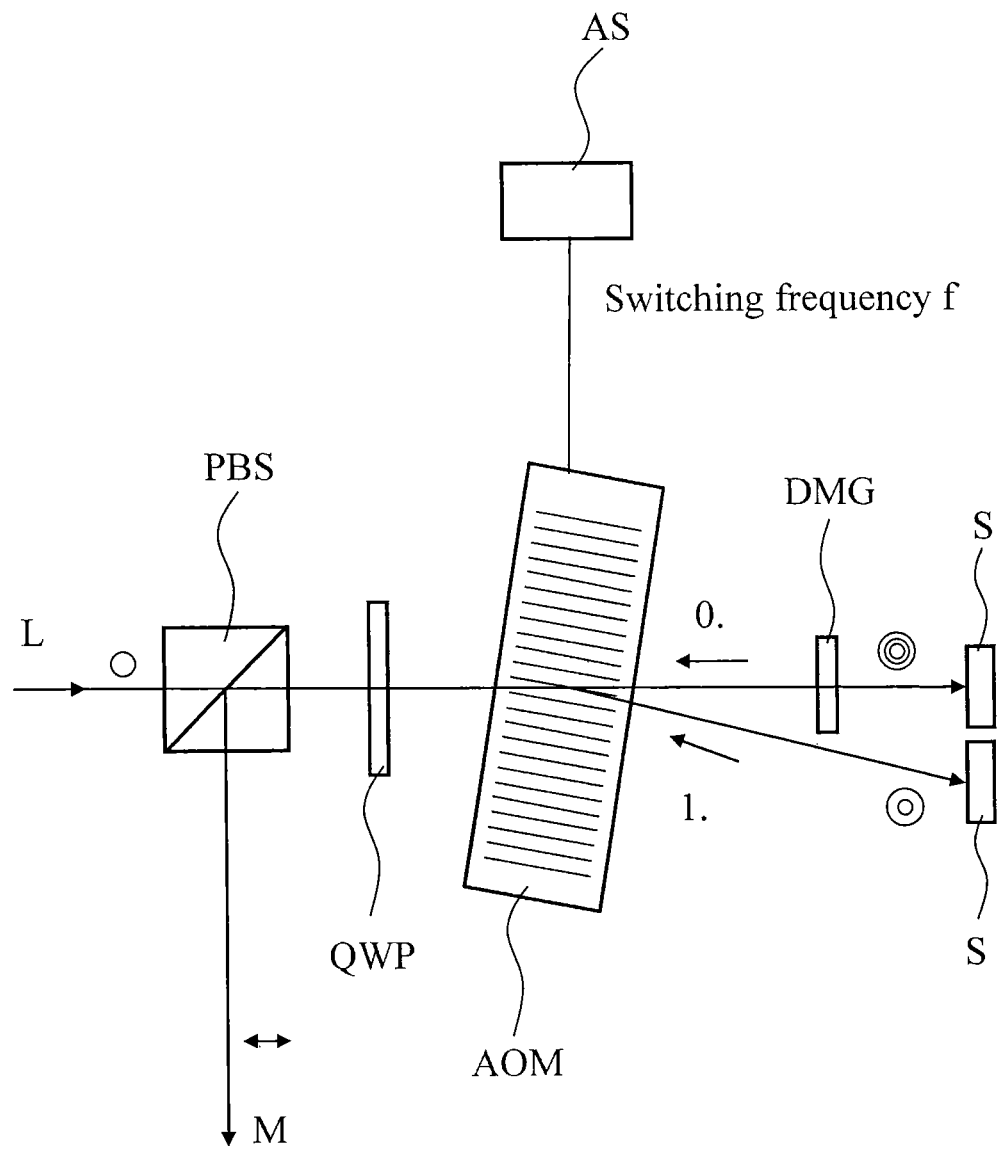
FIG. 3 is a diagram schematically illustrating switching between field modes by means of an acousto-optic modulator ("AOM").

FIG. 3 shows the rapid switching between two field modes (e.g., Laguerre-Gauss and Gauss mode) by means of an AOM; that is, transformation of a Gaussian field into a time-dependent superimposition of a Gaussian and Gauss-Laguerre mode.

A PBS is again provided.

In the continuous beam path after the PBS, an AOM is arranged after a quarter wave plate QWP which performs polarization rotation in order to be able to direct the returning beam through the PBS in the direction of the additional microscope M; in the O of the AOM and initial alignment there are reflecting elements S which reflect the light back in the same direction in the AOM.

In the 0. arrangement a "donut mode generator" DMG (e.g., a spiral phase plate or "radial polarizer") is provided in the beam path between the AOM and S.

This embodiment of the invention presents an advantageous variation of Embodiment 2a mentioned above.

In so doing, a Gaussian beam with a linear polarization is beamed in through a polarizing beam splitter and a quarter wave plate influencing the polarization in an AOM or AOTF actuated by a control unit AS (for very rapid switching an AOM; for slower, but polychromatic modulation, an AOTF can also be used).

In the AOM, a temporally varying grid can now be developed by beaming in an acoustic field in which this beam is, for example, in each case refracted in its 0. and its 1. ordering. Between these orderings, there is therefore rapid (high frequency) switching on and off. Then the beam again encounters a mode producing element on one of its paths such as, for example, a donut mode generating element DMG whereby, in addition to the donut modes, also other mode generating elements, e.g., for the production of higher Gauss-Laguerre modes, are conceivable and are subsequently reflected on an initial mirror. After that, the element is encountered a second time. The other ordering is, however, only reflected on one mirror. Both orderings then again encounter the AOM and in so doing are thereby again brought into the AOM into a beam direction, whereby they normally, though in individual cases depending on the mode producing element, again leave the AOM in the linear exit polarization. By rotating this field by means of a quarter wave plate QWP, the beam is then directed to reflect on the polarizing beam splitter cube PBS and can thereby get to the direction of the microscope M and the test.

The detection of the emitted fluorescence beam occurs with appropriate opto-electronic detectors and an optical or electronic demodulation.

Explanation of the detection technique that is used:

Lock-in Technique

Lock-in techniques (LIT) are based on the phase dependent measurement of temporally modulated signals, the basis of which forms a frequency reference. Characteristically, the test is stimulated with a certain frequency during which LI measures the signal with the reference frequency.

The lock-in system LI detects the signal with this specific reference signal depending on the reference phase situation.

In a solid relationship to the reference phase, LI amplifiers generate their own internal measuring phase (normally through a so-called phase-locked loop)

$LI_{ref}=V_L \sin(\omega_L t+\theta_{ref})$

In a classic LI amplifier, the signal is at first reinforced and subsequently multiplied with the LI reference: $LI_{ref}$ by means of a phase sensitive detector (PSD) or a multiplier.

The signal is described by, for example:

$S(t)=V_S \sin(\omega_s t+\theta_s)$ so that at the exit of the PSD one obtains:

$$V_{PSD} = V_S V_L \sin(\omega_s t + \theta_s)\sin(\omega_L t + \theta r_{ref})$$
$$= 1/2 V_S Y_L (\cos([\omega_r - \omega_L]t + \theta_S - \theta_{ref}) -$$
$$\cos([\omega_r + w_L]t + \theta_S + \theta_{ref})$$

Consequently, the exit of the PSD provides two temporally varying signals: one with the difference and one with the sum frequency from the LI reference phase and signal phase. This signal $VI_{PSD}$ is low-pass filtered whereby all high frequency signals are cancelled. Then, with a perfect low-pass, a signal finally only emerges, if $(\omega_r-\omega_L)=0$ applies. Thereby, upon exiting one obtains:

$V_{PSD,TP}=\frac{1}{2}V_S V_L \cos(\theta_S-\theta_{ref})$

Consequently, the LI amplifier extracts the signal with the frequency $\omega_r=\omega_L$ and itself provides an exit signal, which depends linearly on the signal amplitude with this reference frequency.

Figure 4A:
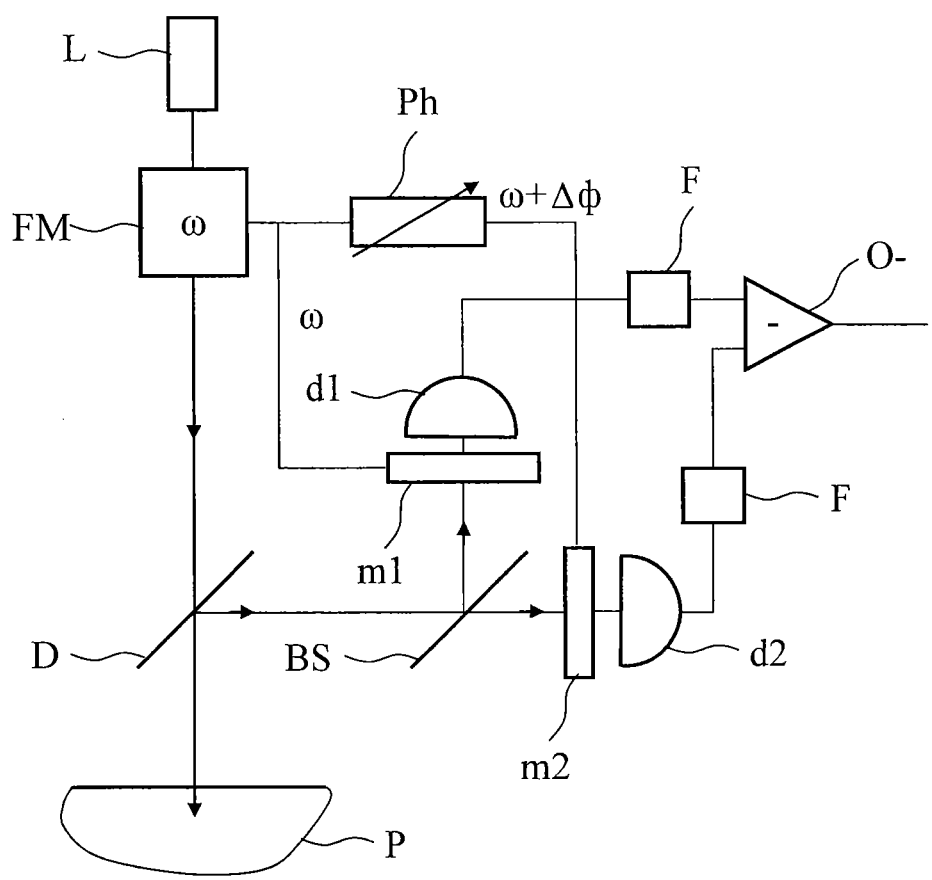
FIG. 4A is a diagram schematically illustrating a microscope configuration.
Figure 4B:
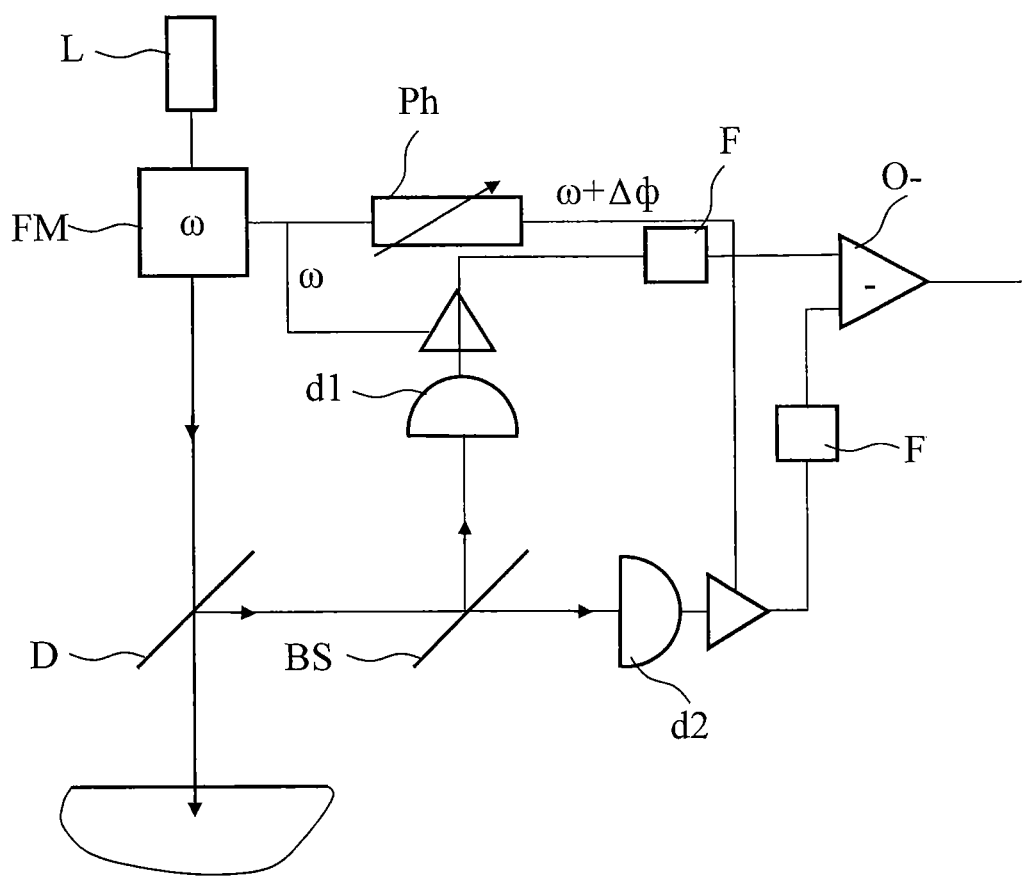
FIG. 4B is a diagram schematically illustrating a microscope configuration.
Figure 4C:
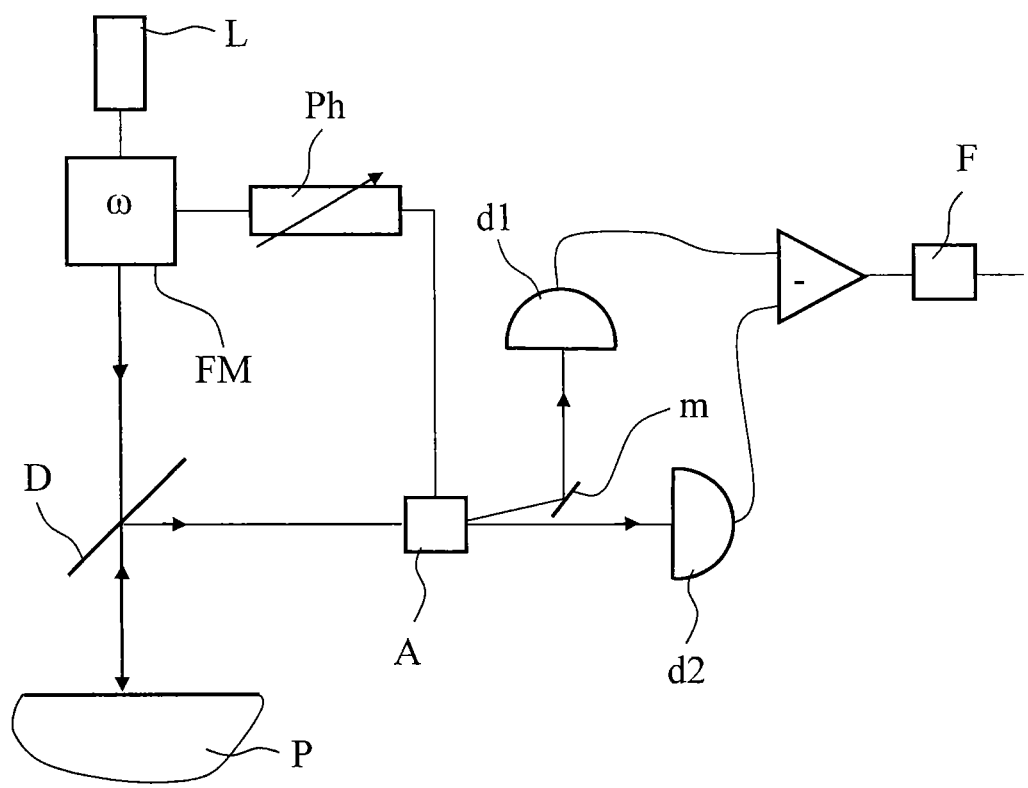
FIG. 4C is a diagram schematically illustrating a microscope configuration.

Further on, on the basis of FIGS. 4A and 4B, arrangements for FMM modulation are presented and described on the whole that also contain alternative arrangements to the state of the technology (lock in techniques) for detecting demodulation and can be advantageously used together with the inventions mentioned above.

According to the invention, optical modulators are used in detecting demodulation or the operating mode of the detectors for demodulation.

Illustration 4A shows a microscope configuration for increasing the penetration depth/suppression of diffuse reflection whereby, in a schematic beam path of a laser L in the direction of a test P, a dichroic mirror/beam splitter D for separating illumination and the beam path detector is provided.

The detection is split up into two partial beam paths using a beam splitter BS, in which detectors d1, d2 are located:

Moreover, optical modulators m1, m2, an element Ph for phase adjustment, a filter F, a focus modulator and a subtraction operator O− are depicted.

The laser L of the fluorescence excitement is modulated with a focus modulator (FM) such as, for example, that depicted on the basis of FIGS. 1 and 2 with the frequency ω.

The fluorescence beam of the test (P) reflected by the dichroic filters (D) and now also modulated with ω is phase-sensitively detected using a 50/50 beam splitter (BS) from two detectors d1 and d2. In addition, by way of example, in each case an additional modulator m is inserted (m1, m2 in 3a) before d1 and d2, or the detector gain from d1 and d2 is modulated (3b).

The plated signals (filter F, e.g., integrator) are then subtracted from each other (operator O−).

The modulators m1, m2 can advantageously be optical modulators such as an EOM; m1 is directly modulated and m2 undergoes a phase retardation via Ph, whereby two partial signals are detected which thereby show a phase difference with respect to each other (delta phi) and are mixed and filtered with low-pass filters; an optic demodulation therefore also advantageously occurs with a discontinued relative phase, in the ideal case 90 degrees between the two detection components so that the conditions with intact focus and postponed conditions are disturbed in those of the focuses by the destructive interference in order to be able to be subtracted from each other (−operator); so the out of focus background (diffuse light) is withdrawn from the focus on each pixel of the signal.

In FIG. 4B, the optical signal is not modulated but that of the "gain" of the detectors (e.g., the acceleration tension of a PMT), in each case controlled by using FM and re-adjusted by using the phase Ph, which filters signals with F and subtracts those with O−.

The detectors d1, d2 are, for example, switched on and off with frequency co (and discontinued phase retardation).

Optical modulation in the detection beam path:

According to the invention, a beam switch for demodulation by means of AOM is used.

Illustration 4C shows an beam path similar to what is depicted in FIG. 3.

Here, however, there is an advantageous switchover between detectors d1 and d2 with frequency co by means of an AOD (A) similar to that depicted in FIG. 2; here, however, in the detection.

On the other hand, and as already depicted and detailed, a subtraction of the in focus and out of focus signals and low-pass filers takes place.

In so doing, so that no beam splitter is used, half of the signal intensity gets lost in each case.

Using Ph, the phase difference can be cancelled.

Figure 6:
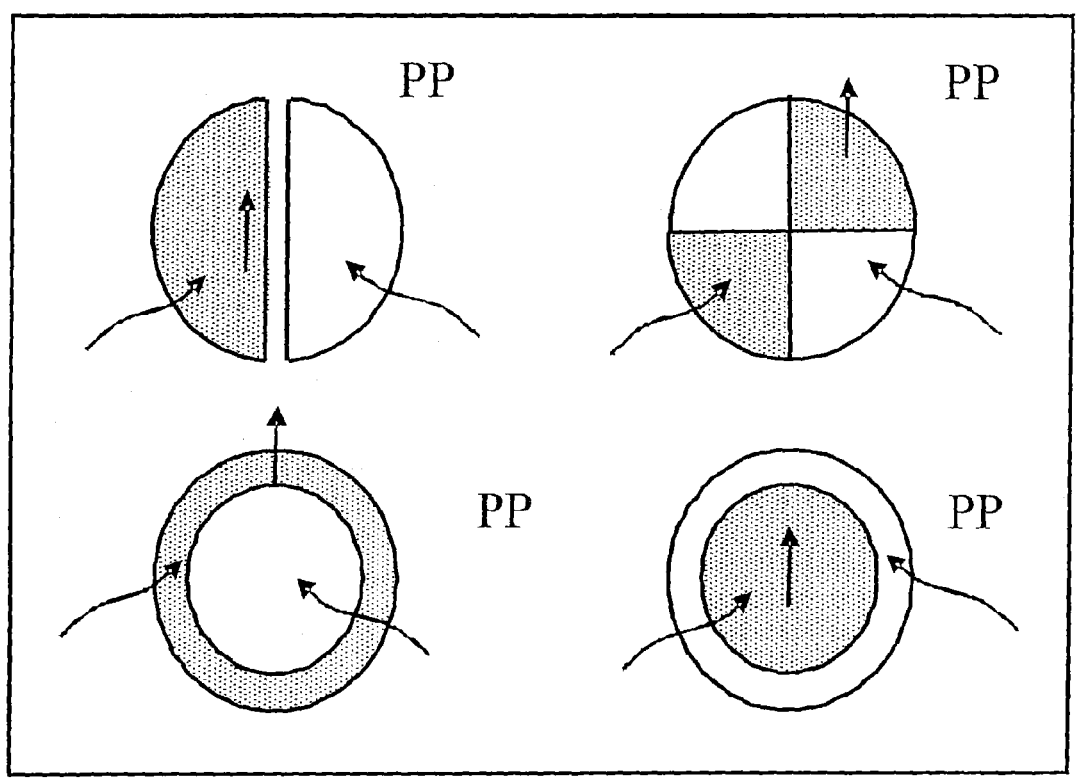
FIG. 6 is a diagram illustrating various modifications of phase plate P.
Figure 7:
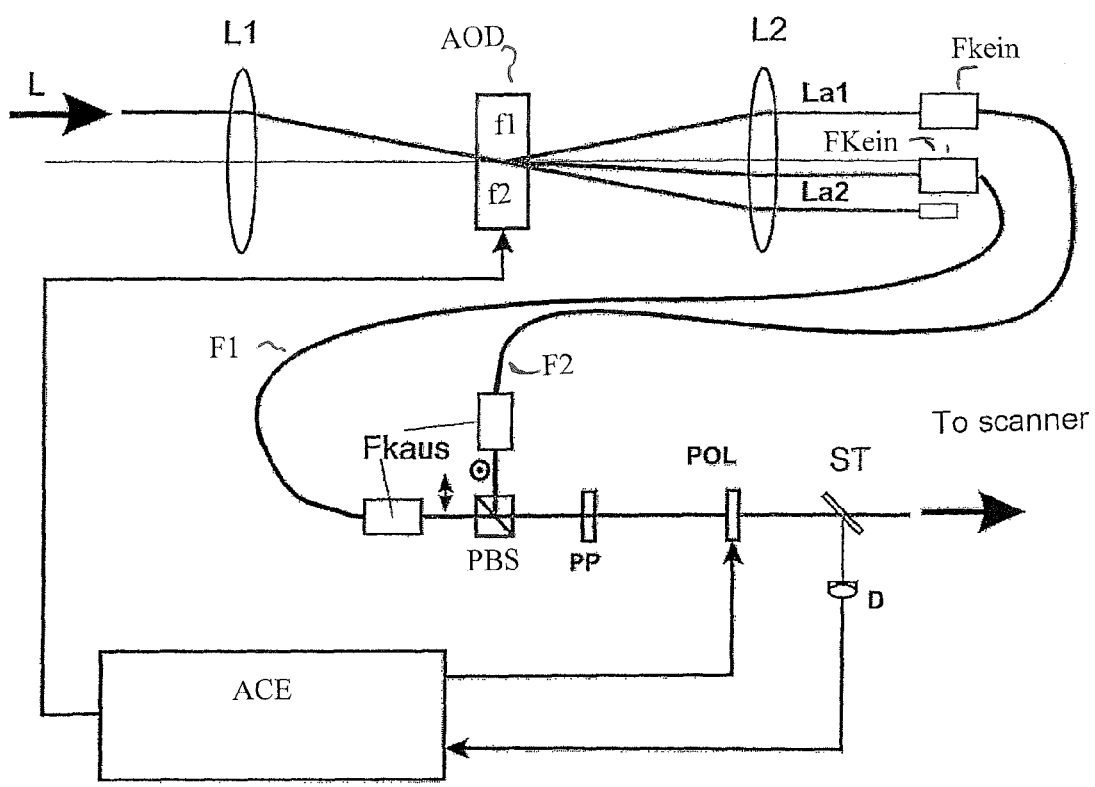
FIG. 7 is a diagram schematically illustrating switching between fiber entrances by means of an AOM or acousto-optic scanner.
Figure 8:
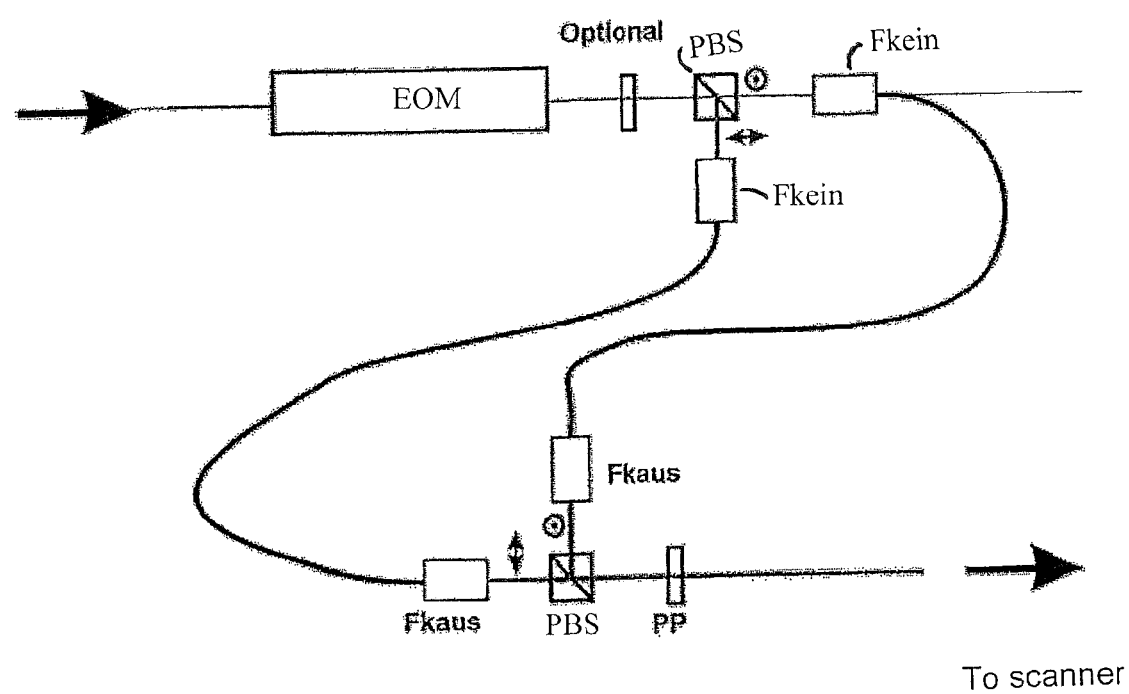
FIG. 8 is a diagram schematically illustrating a rapidly switching fiber coupling.

In FIGS. 6-8 additional embodiments are represented.

The first supplement involves the structure of the phase plate itself. This was originally described in such a way that it consists of a combination of a lambda/2 plate and a plate that operates isotropically. However, more extensively, additional combinations are also possible.

For example, this can be achieved, if, as in FIG. 6, the plate PP is made up of areas that have the effect of a lambda plate (and thus shunt the phase in accordance with lambda and not lambda/2) and areas in which a lambda/2 phase shift is achieved. In general, every arbitrary phase deviation can be realized in different parts of the phase plate if one adjusts the calibration to the advantageous value of lambda/2.

The various designs of a combination of different areas represented in FIG. 1 can, as depicted in FIG. 6, even for different areas, show a phase retardation of lambda or lambda/half, for example, as depicted.

It is especially advantageous, moreover, to achromatize the phase deviation of the two parts against each other.

This can be realized by using so-called "achromatic wave plates" or "achromatic retardation plates" that, for example, consist of various double refractive crystals and exhibit the same optical qualities (the same phase retardation) for a broad band wave length area and whereby then the phase spectra of the isotropic partial plate are adjusted to it while, for example, plates that consist of at least two glasses are used.

With respect to the illumination of the phase plate, it was implied that the polarization direction of the illumination is very rapidly switchable. For this an EOM was proposed above, for example, with which even this rapid rotation of the polarization direction would be made possible. At that point, the lighting to the phase plate was described in such a way that lighting can take place using an optical fiber; in which case the polarization must remain preserved. Furthermore, it has, however, been recognized that another and in various respects more advantageous solution can be achieved, if the polarized light is supplied using two fibers from the phase plate. In this case, as shown in FIG. 7, the light is coupled into two polarization retentive fibers with a defined polarization, whereby it can be switched between the two entrances of the fibers with the frequency F. The exit of one of the fibers is then installed at the outlet source, that is, opposite the exit of the second fiber so that the polarization directions are vertical to each other. This allows the joining of both polarization directions in a polarizing beam splitter cube (PBS), as well as some other suitable type of optical joining such as, for example, an optical fiber coupler, so that a polarization varying with the frequency F at an exit of the PBS is emitted. The switch between the fiber entrances can take place by means of an acousto-optic modulator (or also acoustic-optic scanners) as depicted, for example, in FIG. 7. In so doing, the sound wave is switched in the crystal between the two values $f_{ac}^1$ and $f_{ac}^2$ with the frequency F. In so doing, too, the acoustic frequencies $f_{ac}^1$ and $f_{ac}^2$ thereby each generate a different angle of deflection of the beam of light in La1 and La2. This spatial splitting is used in order to couple into the respective optical fibers. The electronic generation of the two frequencies can, for example, take place with a DDS (Direct Digital Synthesizer) or other suitable frequency switcher.

Another and especially advantageous solution emerges by virtue of the fact that the frequencies $f_{ac}^1$ and $f_{ac}^2$ permanently reside in the acousto-optical crystal and the amplitudes of the two components are temporally modulated. For the technique, this can be meaningfully demonstrated in such a way that the sum of intensity remains constant over time. A technical realization can, for example, take place by means of a DDS (Direct Digital Synthesizer).

The advantages of the represented embodiment emerge from the fact that:

1) it provides for switching an acousto-optic element that is small and shows clear advantages for handling in a microscope;

2) the fibers can be used directly for lighting from the laser module to the scanning head of an LSM.

Likewise, it is possible that, with an EOM in combination with a PBS, a rapidly switching fiber coupling is realized. In this case, a PBS is located behind the EOM which distributes the light directly into both fibers irrespective of the polarization condition (FIG. 8).

It can, moreover, be advantageous if the polarization of the PBS has a pre-determined value. For this, a rotatable polarizer or one that is in some other way adjustable with respect to its polarization influence can be installed after the phase plate.

Having done this, even an intensity calibration can take place per the optical fibers between the two partial beams.

The measurement relating to this can be carried out in the microscope or with an external monitor diode.

For more exact calibrations between the partial beams and the adjustment of the AOM/EOM and the adjustable polarizer's pole, part of the beam can be disconnected after the PBS to a diode D.

Among other things, the fluctuations in intensity that are measured with the diode are used as a control quantity in order to set the maximum amplitudes of the frequencies $f_{ac}^1$ and $f_{ac}^2$.

Up to this point, in every case two fibers and frequencies were assumed. This is to be understood in the sense of an example. The technique can generally be used in switching from N light conditions with, for example, N fibers.

In what follows, the illustrations are to be described in detail.

FIG. 7 describes the rapid switching of polarization by means of an AOD in combination with optic fibers F1, F2 to produce phase switching by means of a suitable phase plate PP. Exemplary embodiments for calibrating the intensities of both switching conditions are shown.

The light of the laser light wave L is beamed in over a lens L1 at the level of an AOD (acousto-optic deflector) whose sound wave in the crystal with a frequency f is switched between different acoustic frequencies f1 and 12 which generate the alternatingly different deflection angle of the laser beam.

The alternatingly deflected laser beams La1, La2 are in each case introduced via fiber couplers Fkein into optical fibers F1, F2 and disconnected by means of a fiber uncoupler FKaus at different positions on a pole splitter PBS.

In this case, fibers F1 and F2 are arranged so that their (preferably linear) polarization is parallel to each other at the PBS and vertical to each other from above.

This is achieved by appropriate rotation of the ends of the fibers as well as the decoupling units, whereby in each case the optimal position can be adjusted behind the PBS for F1 and F2 on the basis of the signal yield from the PBS.

After the PBS, the phase plate PP is arranged as described in FIG. 6 and generates the FMM signal through the phase shift between their halves to be further conducted into the microscope and to the scanning facility.

Using a beam splitter ST, a monitor diode D can be disconnected that is used to adjust the signal intensities and the relationship of the two pole components by using a control unit ACE.

In this case, a rotating polarizer is advantageously provided between PP and ST that can be used for fine tuning the relationship between the two pole components and calibrating possible errors in orienting the fibers F1, F2 to each other as mentioned above.

Using ACE, detection can be synchronized using the monitor diode at the frequency of the switch by the AOD so that the individual intensity components let themselves separate from each other.

FIG. 8 describes another embodiment with an EOM for switching the polarization and thereby the phase after the phase plate in connection with the components, as depicted above on the basis of FIG. 7 or in another mode of action as in FIG. 7. Here, however, the separation takes place into the individual polarization components by a pole splitter PBS1 behind the EOM, whereby, after the PBS, the various pole components are again coupled into separate fibers, F1, F2, which are again beamed into the PBS 2 by orienting the fibers and/or the uncouplings FK with polarizations that are vertical to each other.

The invention claimed is:

1. A microscope, comprising at least one illumination beam along an illumination beam path, a microscope lens for focusing said illumination beam into a sample to generate a field of focus, a detection beam path, at least one optic modulator as an adjustable polarization altering element in said illumination beam path being arranged for switching or rotating polarization direction of said illumination beam at a modulating frequency, a control unit coupled to said adjustable polarization altering element so that said adjustable polarization altering element is actuated at said modulating frequency for rapid switching or rotating polarization of said illumination beam to different current polarization directions, and a structured phase plate arranged in said illumination beam path downstream of said polarization altering element for phase-modulating the illumination beam at said modulating frequency to effect modulation in the field of focus, said phase plate receiving said illumination beam having said different polarization directions, said phase plate having at least two sections with different phase modulation influence, wherein at least one of said sections is birefringent, said microscope being a laser scanning microscope, and wherein said modulation frequency exceeds 1 MHz.

2. A microscope according to claim 1, wherein the polarization altering element is a polarization rotating element.

3. A microscope according to claim 2, wherein the polarization rotating element is an electro-optical modulator (EOM) or an acousto-optic modulator (AOM).

4. A microscope according to claim 1, wherein an optic fiber is arranged between the polarization altering element and the phase plate.

5. A microscope according to claim 1, wherein the phase plate is rotatable.

6. A microscope according to claim 1, wherein the phase plate is a spatial light modulator (SLM).

7. A microscope according to claim 1, wherein the phase plate comprises different sections with different phase delay which, with respect to each other, exhibit a $\lambda/2$ phase shift.

8. A microscope according to claim 1, wherein differently oriented polarization portions arrive via said phase plate in a direction toward said sample, said phase plate being located downstream with respect to said polarization altering element.

9. A microscope according to claim 1, further comprising an adjustable polarizer arranged downstream of the phase plate.

10. A microscope or according to claim 1, wherein, downstream of the phase plate, a part of the illumination beam is disconnectably coupled to a monitor diode used to control polarization distribution and/or an accoustic optical deflector and/or an electro-optical modulator.

11. A microscope according to claim 1, wherein said phase plate has at least one section with an uninfluenced phase and a section or sections with an influenced phase.

12. A microscope according to claim 11, wherein said section or sections with an influenced phase are one $\lambda/2$ plate.

13. A microscope according to claim 1, wherein said switched or rotated polarization of said illumination beam reaches said phase plate.

14. A microscope comprising at least one illumination beam along an illumination beam path, a microscope lens for focusing said illumination beam into a sample to generate a field of focus, a detection beam path, at least one electro-optic modulator (EOM) as an adjustable polarization altering element in said illumination beam path being arranged for switching or rotating polarization direction of said illumination beam at a modulating frequency, a control unit coupled to said adjustable polarization altering element so that said adjustable polarization altering element is actuated at said modulating frequency for rapid switching or rotating polarization of said illumination beam to different current polarization directions, and a structured phase plate arranged in said illumination beam path downstream of said polarization altering element for phase-modulating the illumination beam at said modulating frequency to effect modulation in the field of focus, said phase plate having at least two sections with different phase modulation influence, wherein at least one of said sections is birefringent, said phase plate receiving said illumination beam having said different polarization directions, said microscope being a laser scanning microscope, and wherein lock-in amplifiers are provided for demodulation.

15. A microscope according to claim 14, wherein said switched or rotated polarization of said illumination beam reaches said phase plate.

16. A microscope comprising at least one illumination beam along an illumination beam path, a microscope lens for focusing said illumination beam into a sample to generate a field of focus, a detection beam path, at least one adjustable polarization altering element in said illumination beam path being arranged for switching or rotating polarization direction of said illumination beam at a modulating frequency, a control unit coupled to said adjustable polarization altering element so that said adjustable polarization altering element is actuated at said modulating frequency for rapid switching or rotating polarization of said illumination beam to different current polarization directions, and a structured phase plate arranged in said illumination beam path downstream of said polarization altering element for phase-modulating the illumination beam at said modulating frequency to effect modulation in the field of focus, said phase plate having at least two sections with different phase modulation influence, wherein at least one of said sections is birefringent, said phase plate receiving said illumination beam having said different polarization directions, said microscope being a laser scanning microscope, and wherein an electro-optical modulator is provided for demodulation, or beam switching occurs for demodulation by means of at least one acousto-optic modulator (AOM), or a change of the operation of detectors occur for demodulation.

17. A microscope according to claim 16, wherein said switched or rotated polarization of said illumination beam reaches said phase plate.

18. A method for microscopic detection of light from a sample in a laser scanning microscope, comprising irradiating said sample with at least one illumination beam via a microscope lens for focusing said beam to generate a field of focus, and switching or rotating polarization direction of said illumination beam at at least one optic modulator as an adjustable polarization altering element at a modulating frequency, actuating at said modulating frequency said adjustable polarization unit for rapid switching or rotating polarization of said illumination beam to different current polarization directions by a control unit coupled to said adjustable polarization altering element, thereby generating phase modulation at said modulating frequency to affect modulation in a field of focus by a structured phase plate receiving said illumination beam having said different polarization directions and which has at least two sections with different phase influence, wherein at least one of said sections is birefringent, said phase plate being arranged downstream of said polarization altering element, with demodulation occurring in or after a detection beam path, converting the phase modulation of the illumination in the sample into an intensity modulation of the detected signal.

19. The method of claim 18, wherein an electro-optic modulator (EOM) or an acousto-optic modulator (AOM) is used as the polarization altering element.

20. The method of claim 18, further comprising measuring the sample signals at a change between different phase plates or an adjusted change of the phase modulator.

21. The method according to claim 18, wherein modulation frequency exceeds 1 MHz.

22. The method according to claim 18, wherein said phase plate is a spatial light modulator (SLM).

23. The method of claim 18, wherein said switched or rotated polarization of said illumination beam reaches said phase plate.

24. A microscope comprising at least one illumination beam along an illumination beam path, a microscope lens for focusing said illumination beam into a sample to generate a field of focus, a detection beam path, at least one electro-optic modulator (EOM) as an adjustable polarization altering element in said illumination beam path being arranged for switching or rotating polarization at a modulating frequency, a control unit coupled to said adjustable polarization altering element so that said adjustable polarization altering element is actuated at said modulating frequency for rapid switching or rotating polarization, and a structured phase plate arranged in said illumination beam path downstream of said polarization altering element for phase-modulating the illumination beam at said modulating frequency to effect modulation in the field of focus, said phase plate receiving said illumination beam having different polarization directions, said phase plate having at least two sections with different phase modulation influence, wherein at least one of said sections is birefringent, said microscope being a laser scanning microscope, and wherein an acousto-optic deflector is provided for guiding said illumination beam alternatingly or simultaneously, with modulated amplitude, to an inlet of at least two optical fibers.

25. A microscope according to claim 24, wherein said switched or rotated polarization of said illumination beam reaches said phase plate.

26. A microscope comprising at least one illumination beam along an illumination beam path, a microscope lens for focusing said illumination beam into a sample to generate a field of focus, a detection beam path, at least one optic modulator as an adjustable polarization altering element in said illumination beam path being arranged for switching or rotating polarization at a modulating frequency, a control unit coupled to said adjustable polarization altering element so that said adjustable polarization altering element is actuated at said modulating frequency for rapid switching or rotating polarization, and a structured phase plate arranged in said illumination beam path downstream of said polarization altering element for phase-modulating the illumination beam at said modulating frequency to effect modulation in the field of focus, said phase plate receiving said illumination beam having different polarization directions, said phase plate having at least two sections with different phase modulation influence, wherein at least one of said sections is birefringent, said microscope being a laser scanning microscope, and further comprising coupling means downstream relative to said polarization altering element for coupling in at least two optical fibers.

27. A microscope according to claim 26, further comprising coupling means in the optic fibers for alternating coupling.

28. A microscope according to claim 26, with coupling of respectively different orientations occurring into the optical fibers.

29. A microscope according to claim 26, wherein the ends of the optical fibers or their end couplings are oriented relative to each other such that two radiation portions are provided which are differently polarized.

30. A microscope according to claim 26, further comprising a time dependent weighting of at least two light components generated by amplitude modulation.

31. The microscope according to claim 26, wherein modulation frequency exceeds 1 MHz.

32. A microscope according to claim 26, wherein an electro-optic modulator (EOM) or an acousto-optic modulator (AOM) is used as the polarization altering element.

33. A microscope according to claim 26, wherein said switched or rotated polarization of said illumination beam reaches said phase plate.

* * * * *

UNITED STATES PATENT AND TRADEMARK OFFICE
CERTIFICATE OF CORRECTION

PATENT NO. : 10,156,710 B2
APPLICATION NO. : 13/251452
DATED : December 18, 2018
INVENTOR(S) : Tiemo Anhut, Thomas Kalkbrenner and Daniel Schwedt It is certified that error appears in the above-identified patent and that said Letters Patent is hereby corrected as shown below:

On the Title Page

(75) Inventors: "Daniel Schwedt, Jena (DE)" should be changed to --Daniel Schwedt, Weimar (DE)--.

In the Specification

Column 8, Line 23: now reads: "with frequency co (and discontinued phase retardation)." should read --with frequency $\omega$ (and discontinued phase retardation)--.

Column 8, Line 30: now reads: "between detectors d1 and d2 with frequency co by means of" should read --between detectors d1 and d2 with frequency $\omega$ by means of--.

Signed and Sealed this
Twenty-sixth Day of February, 2019

Andrei Iancu
*Director of the United States Patent and Trademark Office*